United States Patent Office 2,872,440
Patented Feb. 3, 1959

2,872,440

METALLISABLE AZO DYESTUFFS

Robert Ronald Davies, Manchester, England, assignor to Imperial Chemical Industries Limited, a corporation of Great Britain No Drawing. Application October 25, 1954
Serial No. 464,595

Claims priority, application Great Britain
October 30, 1953

2 Claims. (Cl. 260—143)

This invention relates to new metallisable azo dyestuffs and more particularly it relates to new metallisable azo dyestuffs derived from heterocyclic compounds containing hydroxy groups.

According to the invention we provide new metallisable azo dyestuffs characterised in that they contain at least once a group of the formula:

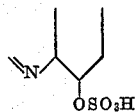

wherein the nitrogen atom is part of a heterocyclic ring.

According to a further feature of the invention we provide a process for the manufacture of the said new metallisable azo dyestuffs which comprises sulphating compounds containing at least once a group of the formula:

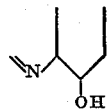

where the nitrogen atom is part of a heterocyclic ring.

The starting materials for use in the said process are obtainable for example by coupling a diazotised primary aromatic amine with a coupling component containing the stated group. Such coupling components include for example 8-hydroxyquinoline, 4-hydroxyacridine, 4-hydroxybenzthiazole, 8-hydroxycinnoline, 2-acetylamino-4-hydroxybenzthiazole, 2-phenyl-4-hydroxybenzthiazole, 2-benzoylamino-4-hydroxybenzthiazole, 4-hydroxy-2-methylbenzoxazole, 7-chloro-8-hydroxy-quinoline and 5-chloro-8-hydroxyquinoline.

2-amino-4-hydroxybenzthiazole (M. P. 144° C.) may be obtained by demethylation with hydrobromic acid, hydriodic acid or aluminium chloride of 2-amino-4-methoxybenzthiazole obtained as described in Helvetica Chimica Acta, 1942, volume 25, page 515. Acetylation of the so obtained 2-amino-4-hydroxybenzthiazole with acetic anhydride gives 2-acetylamino-4-hydroxybenzthiazole. Benzoylation of 2-amino-4-hydroxybenzthiazole similarly gives 2-benzoylamino-4-hydroxybenzthiazole of M. P. 207° C. Interaction of o-anisidine, benzaldehyde and sulphur under the conditions described in German patent specification No. 51,172 for the preparation of 2-phenylbenzthiazole gives 4-methoxy-2-phenylbenzthiazole which, when demethylated with hydriodic acid or with aluminium chloride, gives 4-hydroxy-2-phenylbenzthiazole of M. P. 138° C. 4-hydroxy-2-methylbenzoxazole (M. P. 144° C.) may be obtained by acetylation of 2-amino-1:3-dihydroxybenzene with acetic anhydride and hydrolysis with 2% caustic soda solution.

As primary aromatic amines which may be diazotised and coupled with the coupling components there are particularly to be mentioned certain diamines, for example, benzidine, dianisidine, 4:4'-diaminoazobenzene, 4:4'-diaminobenzanilide, 3':4-diamino-3:4'-dimethoxybenzanilide, 4:4'-diaminodiphenylamine, 4:4'-diaminodiphenylurea, 3:3'-diaminobenzanilide, 3:3'-diaminodiphenylurea, 1:5-diaminonaphthalene, 2:6-diaminonaphthalene, 3:6-diaminocarbazole, 1:8-dichloro-3:6-diaminocarbazole, 4:4'-diaminodiphenoxyethane, 2:5-bis(4'-aminophenyl)-1:3:4-oxadiazole and 4:4'-diaminodiphenylsulphone.

There may also be used as primary aromatic amines which may be diazotised amines other than diamines. Thus there may also be used monoamines which may be for example of the benzene series for example aniline, of the naphthalene series for example 2-naphthylamine or amines containing as part of their structure heterocyclic rings for example 6-aminoindazole and 2-(4'-aminophenyl)-6-methylbenzthiazole.

The diazotisation of the primary aromatic amine and the coupling of it with the appropriate coupling component may be carried out according to known procedures. The starting materials may also be obtained by processes comprising the linking together of compounds, for example azo dyestuffs with one another or with suitable compounds, provided always that the compounds used are so selected that the final starting material contains at least once the stated group.

The sulphation of the said starting material is brought about by treatment of the starting materials with sulphating agents. The sulphating agents which are used may be for example sulphuric acid, chlorosulphonic acid and other known agents for this purpose. Those which we have found to be particularly suitable are the reaction products of tertiary amines for example of pyridine, of 5-ethyl-2-methylpyridine or triethylamine and sulphur trioxide, the addition compounds of sulphur trioxide with amides, for example with dimethylformamide, diethylformamide, dimethylacetamide, diethylacetamide, tetramethylurea, formylpiperidide, acetylpiperidide, formylmorpholide, tetramethyladipamide, dimethlbenzamide, dimethylurethane, N-methylacetanilide, N-methylphthalimidine and N:N-diethyl-p-toluenesulphonamide and the addition products obtainable by reacting chlorosulphonic acid with amides for example with formamide, acetamide, urea, dimethylacetamide and formic anilide, optionally in each case in the presence of an excess of the amine or amide as diluent.

A particularly useful sulphating agent is the reaction product of sulphur trioxide and triethylamine in that sulphation by means of this agent may be effected either by melting it together with the compound to be sulphated at 90–120° C. or by interaction of the reagents in aqueous medium.

As is stated above, the new dyestuffs of this invention are characterised in that they contain at least once a group of the formula:

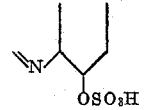

wherein the nitrogen atom is part of a heterocyclic ring. They are useful in the dyeing of textile fibres and particularly in the dyeing of cellulosic textile fibres by known acid after-coppering processes. The —SO$_3$H group of the stated group of the formula:

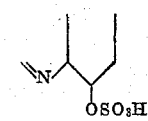

wherein the nitrogen atom is part of a heterocyclic ring, solubilises the dyestuff containing it, and in the process of acid after-coppering the said —SO$_3$H group is removed, with the result that the coppered dyestuff is fixed on the fibre as an insoluble metal complex. Consequently, the coppered dyeings possess an exceptionally high fastness to washing, and this high fastness to washing is obtained without the use of dye fixing agents.

We have found that a preferred class of the dyestuffs of this invention which is particularly suitable for dyeing by the acidic after-coppering process is that class of the dyestuffs of the invention of which the dyestuffs either contain no group, additional to any —$SO_3H$ group in a group or groups of the said formula:

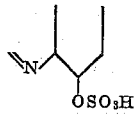

which exerts a solubilising effect, or, if present, additional solubilising groups are in such positions that their effect is either diminished or abolished by the process of metallisation. For example, the additional solubilising group may take part in the metallisation process by being part of an ortho:otho' substituted azo metallisable system. Furthermore, if the additional solubilising group is not part of an ortho:ortho' azo metallisable system, it must be so situated with respect to the —$SO_3H$ group in the stated group

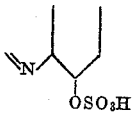

that the two solubilising groups are linked together by a conjugated system, provided that the number of conjugated additional solubilising groups does not exceed one for each stated group of the formula

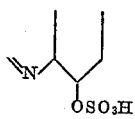

A particularly important class of the dyestuffs of this invention is that which is obtained by sulphation of the product obtained by coupling a tetrazotised primary aromatic diamine of the formula:

$$NH_2—X—NH_2$$

wherein X is a linking group such that the two amino groups are directly attached to aromatic nuclei with at least one molecular proportion of a coupling component containing the stated group

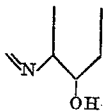

for example 8-hydroxyquinoline.

As examples of suitable linking groups, X, there may be mentioned aromatic nuclei which may optionally bear further substituents for example a benzene nucleus, a naphthalene nucleus, an acridine nucleus and a carbazole nucleus, bridging groups of the formula:

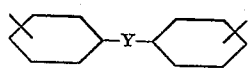

wherein the two benzene nuclei may optionally bear further substituents, and wherein Y stands for a direct linkage or for a bridging group, for example

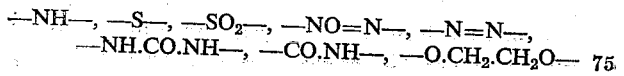

and

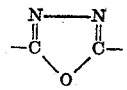

and also a combination of a multiplicity of linkages of the types mentioned above, for example the group

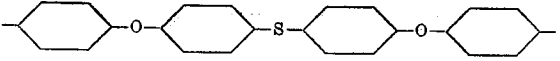

and a system containing a multiplicity of azo groups.

The dyestuffs containing a multiplicity of azo groups mentioned above may be obtained by methods which are commonly used in the art, for example by using as one of the intermediates a diazo component which is a primary aromatic amine containing more than one primary amino group, a coupling component containing more than one coupling position, an intermediate coupling component which contains both a coupling position and an amino group or a group readily convertible thereto as for example by hydrolysis, a component containing a nitro group which may be subsequently reduced to an azo or azoxy group or to an amino group, and subjected to further reaction, for example with phosgene, or by the use of any combination of such intermediates.

The dyestuffs of the invention are of value for the dyeing of cellulosic and other fibres and fabrics, for example those made from or containing nylon and other superpolyamide and polyester fibres and/or from cellulose acetate rayon. The preferred classes of the dyestuffs of the invention are particularly suitable for use in the dyeing of cellulosic fibres and fabrics by the known acid after-coppering processes.

The dyestuffs obtainable by the process of this invention may be used for example for the dyeing of cellulosic fibres, or, from a neutral bath, wool and nylon. Cellulosic fibres may be dyed from a bath containing, if desired, salts, for example sodium sulphate and sodium carbonate. When the dyeings are after-treated with agents yielding metal, for example and especially, agents yielding copper, for example copper salts, dyeings of excellent fastness particularly to light and to washing and exceptional fastness to natural perspirations are obtained. Alternatively the dyestuffs may be applied to cellulosic fibres which have previously been mordanted with an agent yielding metal. By either process dyeings are obtained which possess fastness to washing such that subsequent use of a dye-fixing agent is unnecessary.

The invention is illustrated but not limited by the following examples in which the parts are by weight.

*Example 1*

2.5 parts of the compound obtained by coupling one molecular proportion of tetrazotised 4:4'-diaminodiphenyl with two molecular proportions of 8-hydroxyquinoline are dissolved in 50 parts of N:N-dimethylformamide and the solution is stirred at 30° C. 12 parts of the addition product of sulphur trioxide and N:N-dimethylformamide are then added. The mixture is then heated to 50° C. and is kept, with stirring, at this temperature for 90 minutes. It is then poured into a solution of 9.1 parts of sodium carbonate in 180 parts of water, filtered and dried. The resulting dyestuff is soluble in water and, when applied to cellulose fibres and after-coppered from an acid bath, it gives red dyeings of excellent fastness to washing and of good light fastness.

*Example 2*

2.1 parts of the compound obtained by coupling one molecular proportion of tetrazotised 4:4'-diamino-3:3'-dimethoxydiphenyl with two molecular proportions of 8-hydroxyquinoline is dissolved in 50 parts of N:N-dimethylformamide and the solution is stirred at 30° C. 10.2 parts of the addition product of sulphur trioxide and N:N-dimethylformamide are added. The mixture is then heated to 50° C. and kept, with stirring, at this temperature for 180 minutes. It is then poured into 10 parts of ice and 50 parts of 2 N aqueous caustic soda solution, and the mixture is heated to 90° C. The filtrate is diluted with water to 200 parts, heated to 80° C. and 40 parts of sodium chloride are added. It is then cooled to 25° C. and filtered. The solid residue is washed and dried. The resulting dyestuff is completely soluble in water to give an orange brown solution which dyes cellulose fibres by the normal acidic after-coppering process to give rubine shades of excellent wash fastness and good light fastness. The dyestuff also possesses good build-up properties.

Example 3

2 parts of the compound obtained by coupling one molecular proportion of tetrazotised 4:4'-diaminoazobenzene with two molecular proportions of 8-hydroxyquinoline are mixed with 50 parts of N:N-dimethylformamide and sulphated in the manner described in Example 2. The sulphated product is isolated in the manner described in Example 2. The resulting dyestuff, when applied to cellulose fibres by the acidic after-coppering process, gives violet shades of excellent fastness to washing and of good light fastness.

Example 4

Proceeding in a manner similar to that described in Example 3 the compound obtained by coupling one molecular proportion of tetrazotised 4:4'-diaminobenzanilide with two molecular proportions of 8-hydroxyquinoline is sulphated to give a dyestuff which dyes cellulose fibres by the acidic after-coppering method to give bright orange shades of excellent wash fastness and of high light fastness.

Example 5

2.5 parts of the compound obtained by coupling one molecular proportion of tetrazotised 4:4'-diaminobenzanilide with two molecular proportions of 8-hydroxyquinoline are mixed with 4 parts of the addition product of sulphur trioxide and triethylamine and are heated at 110° C. to 120° C. for 30 minutes, after which the melt is poured on to a mixture of 50 parts of 2 N sodium carbonate solution and 100 parts of water. The mixture is then heated to 60° C. and then 10 parts of sodium chloride are added. The mixture is filtered and the solid residue is washed with 5% brine and is then dried. The product is identical with that obtained by the procedure of Example 4.

Alternatively, a suspension of 2.5 parts of the same starting material in 150 parts of water may be sulphated by treatment with equivalent proportions of caustic soda and the addition product of sulphur trioxide and triethylamine at 95° C. until the product is completely soluble in dilute aqueous sodium carbonate.

Example 6

The following table illustrates the shades obtained with dyestuffs by sulphating compounds obtained by coupling one molecular proportion of a diamine with two molecular proportions of a metallisable end component.

| Formula of diamine | Formula of end component | After-coppered shade on cotton |
|---|---|---|
| H₂N—⟨CH₃O⟩—NHCO—⟨OCH₃⟩—NH₂ | 8-hydroxyquinoline (HO on N-ring) | Orange. |
| NH₂—⟨⟩—NHCONH—⟨⟩—NH₂ | 8-hydroxyquinoline (OH) | Do. |
| H₃C—⟨S,N benzothiazole⟩—C—⟨⟩—NH₂ (with H₂N on benzothiazole) | 8-hydroxyquinoline (OH) | Red. |
| H₂N—⟨⟩—NHCO—⟨⟩—NH₂ | 8-hydroxyquinoline (OH) | Yellow brown. |
| H₂N—⟨⟩—NH₂ (m-phenylenediamine) | 8-hydroxyquinoline (OH) | Orange. |
| H₂N—⟨⟩—NHCONH—⟨⟩—NH₂ | 8-hydroxyquinoline (OH) | Yellow brown. |
| H₂N—⟨⟩—OCH₂CH₂O—⟨⟩—NH₂ | 8-hydroxyquinoline (OH) | Orange. |

| Formula of diamine | Formula of end component | After-coppered shade on cotton |
|---|---|---|
| H₂N—⌬—SO₂—⌬—NH₂ | 8-hydroxyquinoline | Yellow-red. |
| NH₂—⌬—⌬—NH₂ | 8-hydroxyquinoline | Red. |
| NH₂—⌬—C(=N—N=)C—⌬—NH₂ (oxadiazole) | 8-hydroxyquinoline | Scarlet. |
| H₂N—⌬(CO,NH)⌬—NH₂ | 8-hydroxyquinoline | Red. |
| H₂N—⌬(CH₂)⌬—NH₂ | 8-hydroxyquinoline | Do. |
| H₂N—⌬(NH)⌬—NH₂ | 8-hydroxyquinoline | Do. |
| H₂N—⌬(Cl)(NH)(Cl)⌬—NH₂ | 8-hydroxyquinoline | Do. |
| 1,5-diaminonaphthalene | 8-hydroxyquinoline | Do. |
| 2,6-diaminonaphthalene | 8-hydroxyquinoline | Do. |
| NH₂—⌬—CH=CH—⌬—NH₂ | 8-hydroxyquinoline | Bluish red. |
| H₂N—⌬(OCH₃)—⌬(OCH₃)—NH₂ | 8-hydroxyquinoline | Rubine. |
| H₂N—⌬(OCH₃)—⌬(OCH₃)—N=N—⌬(OCH₃)(CH₃)—NH₂ | 8-hydroxyquinoline | Violet. |
| H₂N—⌬(SO₂)⌬—NH₂ | 8-hydroxyquinoline | Red violet. |

| Formula of diamine | Formula of end component | After-coppered shade on cotton |
|---|---|---|
| H₂N–⌬–NH–⌬–NH₂ | HO, N (fused bicyclic) | Violet. |
| H₂N–⌬–NH₂ | HO, N | Red brown. |
| H₂N–⌬–N=N–⌬–NH₂ | HO, N | Bluish brown. |
| H₅C₂O–, H₂N– (acridine) –OC₂H₅, –NH₂ | OH, N | Violet. |
| H₂N– (acridine, N-CH₃) –NH₂ | OH, N | Do. |
| CH₃O–, H₂N–⌬–CH₂–⌬–OCH₃, –NH₂ | OH, N | Pink. |
| NH₂–⌬–O–⌬–S–⌬–O–⌬–NH₂ | OH, N | Orange. |
| H₂N–⌬–S–⌬–NH₂ | OH, N | Salmon pink. |
| H₂N–⌬–CH₂–CH₂–⌬–NH₂ | OH, N | Orange. |
| H₂N–⌬–⌬(NO₂)–NH₂ | OH, N | Yellow red. |
| H₂N–⌬–NH.CO–⌬–NH₂ | OH, N, Cl | Red-orange. |
| CH₃O–, H₂N–⌬–⌬–OCH₃, –NH₂ | OH, N, Cl | Bordeaux. |

| Formula of diamine | Formula of end component | After-coppered shade on cotton |
|---|---|---|
| H₂N—⟨CH₃O⟩—⟨OCH₃⟩—NH₂ | 2-Cl, 8-OH quinoline | Blue-rubine. |
| NH₂—⟨⟩—NHCONH—⟨⟩—NH₂ | OH, N=C.NH₂ benzothiazole | Yellow. |
| H₂N—⟨⟩—NHCO—⟨⟩—NH₂ | OH, N=CH benzothiazole | Do. |
| NH₂—⟨⟩—NHCONH—⟨⟩—NH₂ | OH, N=C.NHCOCH₃ benzothiazole | Orange. |
| NH₂—⟨⟩—OCH₂CH₂O—⟨⟩—NH₂ | OH, N=C.CH₃ benzothiazole | Yellow. |
| NH₂—⟨⟩—NHCONH—⟨⟩—NH₂ | OH, N=C—⟨⟩ benzothiazole | Yellow brown. |
| NH₂—⟨⟩—OCH₂CH₂O—⟨⟩—NH₂ | OH, N=C—⟨⟩ benzothiazole | Yellow. |
| NH₂—⟨⟩—(oxadiazole)—⟨⟩—NH₂ | OH, N=C.NHCOCH₃ benzothiazole | Orange. |
| H₂N—⟨⟩—NHCONH—⟨⟩—NH₂ | OH, N=C.NH₂ benzothiazole | Yellow. |
| H₂N—⟨⟩—NHCONH—⟨⟩—NH₂ | OH, N=C.NHCO—⟨⟩ benzothiazole | Yellow orange. |
| H₂N—⟨⟩—OCH₂CH₂O—⟨⟩—NH₂ | OH, N=C.NHCOCH₃ benzothiazole | Greenish yellow. |
| H₂N—⟨⟩—NHCONH—⟨⟩—NH₂ | OH, N=C.NHCOCH₃ benzothiazole | Do. |

*Example 7*

A solution containing 3.08 parts of 5-nitro-2-aminophenol in 120 parts of water, 10 parts 2 N sodium carbonate solution and 4 parts of 40% aqueous sodium nitrite solution is added at a temperature below 5° C. to a mixture of 8 parts of 36% hydrochloric acid and 100 parts of ice. The mixture is stirred at this temperature for 30 minutes and then any excess nitrous acid is removed by the addition of sulphamic acid. The mixture is then added at a temperature below 10° C. to a solution of 2.8 parts of 2-amino-5-naphthol-7-sulphonic acid and 10 parts of sodium bicarbonate in 200 parts of water, and stirred at this temperature overnight. The mixture is filtered and the solid residue is washed with 50 parts of water and is then dissolved in 200 parts of water containing 5 parts of 2 N sodium hydroxide solution. The solution is heated to 70° C., 4 parts of sodium sulphide crystals dissolved in 20 parts of water are added, and the mixture is stirred at a temperature of 70–75° C. for 3 hours, after which 5 parts of sodium bicarbonate are added, the temperature is raised to 80° C. and 40 parts of sodium chloride are then added. The mixture is stirred and allowed to cool to 40° C. It is then filtered and the solid residue is washed with 50 parts of 20% brine. This solid is dissolved in 100 parts of water, 10 parts of 2 N sodium carbonate solution and 3.5 parts of 40% aqueous sodium nitrite solution are added, and the resultant solution is added to a mixture of 50 parts of ice and 10 parts of 36% hydrochloric acid at a temperature below 5° C. and stirred at this temperature for 30 minutes, after which excess nitrous acid is removed by the addition of sulphamic acid. The suspension is added at a temperature below 10° C. to a solution of 3 parts of 8-hydroxyquinoline in 50 parts of β-ethoxyethanol and 10 parts of 2 N sodium hydroxide, together with sufficient 2 N sodium carbonate solution to maintain alkalinity to Brilliant Yellow, and the mixture is stirred at a temperature below 10° C. overnight and is then filtered. The solid residue is washed with 100 parts of water, is dried and is then ground with 12 parts of the addition product of triethylamine and sulphur trioxide. This mixture is heated to 115° C. for about 30 minutes, until a sample is completely soluble in dilute sodium carbonate and is then added to a mixture of 70 parts of water and 30 parts of 2 N sodium carbonate solution, the mixture is heated to 90° C. and 20 parts of sodium chloride are added. The suspension is cooled to 50° C., is filtered and the solid residue is then washed with 50 parts of 20% brine and dried. The product is soluble in water, and when applied to cellulosic fibres by the acidic after-coppering process, it gives greenish grey dyeings of excellent fastness to light and to washing.

By replacement of the 3.08 parts of 5-nitro-2-aminophenol in the above example by 3.64 parts of 5-nitro-2-aminobenzoic acid a dyestuff is obtained which gives greenish navy blue after-coppered shades of excellent fastness properties, when applied to cellulosic fibres.

Similarly, by replacement of the 3.08 parts of 5-nitro-2-aminophenol in the above example by 4.24 parts of 5-nitro-2-aminophenoxyacetic acid, a dyestuff is obtained which gives bluish grey after-coppered shades of excellent fastness to light and to washing when applied to cellulosic fibres.

Example 8

A solution containing 14.2 parts of the aminomonoazo dyestuff obtained, as described in Example 7, by coupling diazotised 5-nitro-2-aminophenol with 2-amino-5-naphthol-7-sulphonic acid, 10 parts of 2 N sodium carbonate solution and 6 parts of 40% sodium nitrite solution in 200 parts of water is added to a mixture of 50 parts of ice and 15 parts of 36% hydrochloric acid and is stirred for 30 minutes at a temperature below 5° C., after which excess nitrous acid is removed by the addition of sulphamic acid. The mixture is added to a solution of 4.8 parts of 8-hydroxyquinoline in 150 parts of β-ethoxyethanol and 20 parts of 2 N sodium hydroxide solution at a temperature below 10° C. together with sufficient 2 N sodium carbonate solution to maintain the whole alkaline to Brilliant Yellow. The mixture is stirred at the same temperature overnight, and is then heated to 80° C., 80 parts of sodium chloride are added and the mixture is filtered. The residue is washed with 50 parts of 10% brine and is then dissolved in 300 parts of water at 85° C. The solution is filtered and 15 parts sodium chloride are added to the hot filtrate. The resultant suspension is filtered at 85° C. and the residue is washed with 50 parts of 5% brine and is then dried.

5.83 parts of the dried disazo dyestuff are dissolved in 500 parts of water and 25 parts of 32% aqueous sodium hydroxide solution and the solution is heated to 60° C. with stirring. A solution of 2 parts of glucose in 20 parts of water is added and stirring is continued at 60–65° C. for 1 hour after which 20 parts of sodium bicarbonate are added, the temperature is raised to 90° C., and 50 parts of sodium chloride are added. The suspension is filtered and the solid residue is purified by solution in 200 parts of water, reprecipitation at 85° C. by addition of 20 parts of sodium chloride, and filtration. The residue is dried and 4.7 parts of the dried powder are mixed with 15 parts of the addition compound from triethylamine and sulphur trioxide. The mixture is heated at 115° C. for 1 hour and is then added to a mixture of 300 parts of 15% brine and 20 parts of 2 N sodium carbonate solution. The suspension is filtered and the solid residue is dissolved in 200 parts of water at 80° C. containing 20 parts of 2 N sodium carbonate solution, and 40 parts of sodium chloride are added to the resultant solution. The suspension is filtered and the residue is washed with 20 parts of 20% brine and dried.

When applied to cellulosic fibres by the acidic after-coppering process the product gives grey dyeings of excellent fastness to light and to washing.

Example 9

A solution of 2.66 parts of 6-aminoindazole in 100 parts of water and 10 parts of 36% hydrochloric acid is diazotised at a temperature below 5° C. by the addition of 4 parts of 40% aqueous sodium nitrite solution. The diazo solution thus obtained is stirred at a temperature below 10° C. for 3 hours with a solution of 2.8 parts of 2-amino-5-naphthol-7-sulphonic acid and 20 parts of sodium bicarbonate in 200 parts of water. The suspension is filtered and the solid residue is washed with 50 parts of water. The solid is dissolved in 200 parts of water at 50° C., 4 parts of 40% sodium nitrite solution are added, and the solution is diazotised, at a temperature below 5° C., by adding it to a mixture of 100 parts of ice and 10 parts of 36% hydrochloric acid. The mixture is stirred at a temperature below 5° C. for 30 minutes, after which excess nitrous acid is removed by the addition of sulphamic acid. The mixture is then added to a solution of 2.9 parts of 8-hydroxyquinoline and 10 parts of 2 N sodium hydroxide solution in 100 parts of β-ethoxyethanol together with sufficient 2 N sodium carbonate solution to maintain alkalinity to Brilliant Yellow. The mixture is stirred at a temperature below 10° C. overnight, and is then heated to 85° C. and is salted to 20% w./v. with sodium chloride. The resultant suspension is filtered and the solid residue is washed with 5% brine and dried. 2.4 parts of the residue are mixed with 10 parts of the addition compound of triethylamine and sulphur trioxide and the mixture is heated at 115° C. for 1 hour, and is then added to a mixture of 75 parts of water and 20 parts of 2 N sodium carbonate solution and diluted with 100 parts of saturated brine. The resulting suspension is filtered and the solid residue is washed with 10 parts of saturated brine and dried.

When applied to cellulosic fibres by the acidic after-coppering process the product gives bluish violet shades of good fastness to light and washing.

By replacement of the 2.66 parts of 6-aminoindazole in the above example by 3.08 parts of 5-nitro-2-aminophenol, a dyestuff is obtained which gives greenish blue after-coppered shades of excellent fastness to light and to washing, when applied to cellulosic fibres.

Example 10

A solution of 4.22 parts of the sodium salt of 2-aminophenol sulphuric acid ester in 200 parts of water is cooled to −5° C. 5 parts of 36% hydrochloric acid are added and the solution is diazotised by the addition during 10 minutes of 1.38 parts of sodium nitrite dissolved in 10 parts of water at 0 to −5° C. The diazo suspension so obtained is added with stirring to a solution of 2.2 parts of resorcinol and 6.8 parts of sodium carbonate in 100 parts of water at 0° C., and stirred at that temperature for 30 minutes. A solution prepared by diazotising a suspension of 3.26 parts of 4-amino-4'-acetylaminodiphenyl in a mixture of 50 parts of water, 50 parts of ice and 5 parts of 36% hydrochloric acid by the addition of 3.5 parts of 40% sodium nitrite solution, is added together with sufficient ammonium hydroxide (S. G. 0.88) to maintain the mixture alkaline to Brilliant Yellow. The mixture is stirred at 0–10° C. overnight, after which the suspension is filtered, and the solid residue is washed with cold water. The solid is stirred overnight with 200 parts of 4% sodium hydroxide solution and the resultant solution is diluted with 200 parts of saturated brine. The suspension is filtered, and the solid residue is washed with 20% brine and dried. 5.4 parts of the dried solid are dissolved in a mixture of 300 parts of water and 10 parts of 2 N sodium hydroxide solution, 2 parts of 40% sodium nitrite solution are added and the mixture is added to a mixture of 50 parts of ice and 10 parts of 36% hydrochloric acid at a temperature below 5° C. and stirred for 2 hours. Excess of nitrous acid is removed by the addition of sulphamic acid and the diazo suspension is added to a solution of 1.5 parts of 8-hydroxyquinoline in a mixture of 50 parts β-ethoxyethanol, 50 parts water, 5 parts 2 N caustic soda solution, and 40 parts of 2 N sodium carbonate solution at a temperature below 10° C. The mixture is stirred overnight at this temperature and is then filtered and the solid residue is washed with water and is then dried.

2.5 parts of this solid are mixed with 10 parts of the addition product of triethylamine and sulphur trioxide and heated at 115° C. for 30 minutes, and the mixture is added to a mixture of 200 parts of water and 20 parts of 2 N sodium carbonate solution. 40 parts of sodium chloride are added and the mixture is stirred at 20–25° C. for 30 minutes, after which the suspension is filtered and the solid residue is washed with 20 parts of 10% brine and is dried.

The product is soluble in water and when applied to cellulosic fibres by the acidic after-coppering process gives reddish brown dyeings of good fastness to light and to washing.

*Example 11*

A stirred suspension of 1.95 parts of 4-aminostilbene in a mixture of 50 parts of water and 5 parts of 36% hydrochloric acid is diazotised at 0–5° C. by the addition of 20 parts of N/2 sodium nitrite solution during 10 minutes, and stirring at 0–5° C. is continued for a further hour. The diazo solution thus obtained is added at a temperature below 10° C. to a solution of 1.8 parts of 4:4'-dihydroxy-2:2'-benzthiazyl urea in a mixture of 50 parts of β-ethoxyethanol, 50 parts of water and 5 parts of 2 N sodium hydroxide solution together with sufficient 2 N sodium carbonate to maintain the whole alkaline to Brilliant Yellow. The mixture is stirred at 0–10° C. overnight, and is then filtered and the solid residue is washed with water and dried. 2.68 parts of the dried residue are heated at 115° C. for 1 hour with 10 parts of the addition product of triethylamine and sulphur trioxide and the mixture is added to 100 parts of water containing 40 parts of 2 N sodium carbonate solution. The resulting solution is steam distilled to remove triethylamine and filtered at 90° C. The filtrate is salted to 25% w./v. with sodium chloride, filtered again, and the solid residue is washed with cold 20% brine and dried. The product dyes cellulosic fibres by the acidic after-coppering process in greenish yellow shades of excellent fastness to light and to washing.

The 4:4'-dihydroxy-2:2'-benzthiazyl urea used in the above example may be obtained as follows: 8.3 parts of 2-amino-4-hydroxybenzthiazole are suspended in a mixture of 300 parts of water and 20 parts of 32% sodium hydroxide solution. Phosgene is passed at 20–25° C. into the solution which is kept alkaline to Clayton Yellow by the addition of 32% sodium hydroxide solution as required until a test sample shows only a trace of amine to be present. The suspension is then heated at 40–45° C. for 30 minutes, and is maintained alkaline to Clayton Yellow during this time, and is then filtered and the solid residue is washed with dilute hydrochloric acid until free from amine and is then dried. The product so obtained has M. P. 282° C.

*Example 12*

3 parts of the compound obtained by coupling one molecular proportion of diazotised aniline with one molecular proportion of 8-hydroxyquinoline are mixed with 18 parts of the addition product of sulphur trioxide and triethylamine. The mixture is heated to 115° C., is stirred at this temperature for half an hour, and is then poured into a mixture of 100 parts of water and 50 parts 2 N sodium carbonate solution. The resulting solution is salted to 5% weight/volume with common salt and the mixture is filtered. The solid residue is washed with 20 parts of cold water, and dried.

The resulting dyestuff is readily soluble in water and when applied to nylon or cellulose acetate fibres by the acidic after-coppering process it gives orange shades of excellent fastness to washing and of good fastness to light.

*Example 13*

2 parts of the compound obtained by coupling one molecular proportion of a p-nitrobenzenediazonium salt with one molecular proportion of 8-hydroxyquinoline are sulphated by the method of Example 12. The resulting dyestuff is water-soluble and when applied to nylon or to cellulose fibres by the acidic after-coppering process gives red shades of excellent fastness to washing and to light.

*Example 14*

1.5 parts of the compound obtained by coupling one molecular proportion of a p-diethylaminobenzenediazonium salt with one molecular proportion of 8-hydroxyquinoline are sulphated by the method of Example 12.

The product is water-soluble and when applied to nylon or to cellulosic fibres by the acidic after-coppering process gives red shades of excellent fastness to washing and to light.

What I claim is:

1. Copper complexes of azo dyestuffs of the formula:

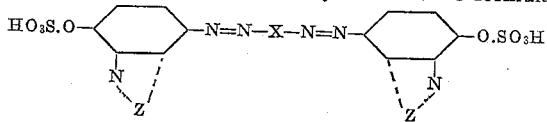

wherein X is the radical of a tetrazotisable aromatic diamine which is free from sulphonic acid and carboxylic acid groups and is selected from the class consisting of monocyclic aryl, dicyclic aryl, carbazole, acridine, fluorene, phenylbenzthiazole and R₁—Y—R₂ radicals wherein Y stands for a member of the group consisting of a direct linkage, —NH—, —NH—CO—NH—, —N=N,

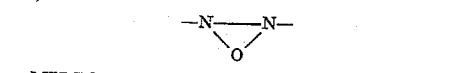

—NHCO—, —S—, —OCH₂.CH₂O, —SO₂—

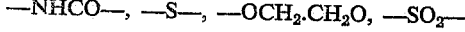
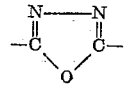

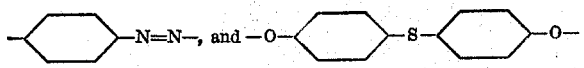

and $R_1$ and $R_2$ stand for monocyclic aromatic nuclei and Z is a group of non-metallic atoms which together with the N-atom form a heterocyclic ring selected from the group consisting of 5- and 6-membered heterocyclic rings.

2. Copper complexes of azo dyestuffs according to claim 1 wherein Z stands for the group of atoms which complete a quinoline ring.

References Cited in the file of this patent

UNITED STATES PATENTS

| | | |
|---|---|---|
| 1,483,084 | Green et al. | Feb. 12, 1924 |
| 1,775,605 | Schweitzer | Sept. 9, 1930 |
| 2,283,294 | Straub et al. | May 19, 1942 |
| 2,671,775 | Hanhart | Mar. 9, 1954 |
| 2,697,093 | Jones | Dec. 14, 1954 |

OTHER REFERENCES

Groggins: Unit Processes, 4th ed., 1952, pp. 288–289.